Patented Apr. 12, 1932

1,854,045

UNITED STATES PATENT OFFICE

GEORG KRÄNZLEIN, HEINRICH GREUNE, AND HEINRICH VOLLMANN, OF FRANKFORT-ON-THE-MAIN-HOCHST, GERMANY, ASSIGNORS TO GENERAL ANILINE WORKS INC., A CORPORATION OF DELAWARE

DYESTUFFS OF THE PHENAZINE SERIES AND PROCESS OF PREPARING THEM

No Drawing. Application filed June 10, 1929, Serial No. 369,918, and in Germany February 16, 1924.

The present invention relates to dyestuffs of the phenazine series and to processes of preparing them.

In German Patents Nos. 365,902, 368,168 to 368,172 there are described condensation products which are obtained by subjecting hydroxyphenazines or naphthosultam-3.4-phenazines to reaction with 2-chloro-1.4-quinones or their substitution products or with mono- or dichloro-4-napththosultam-quinone.

We have found that compounds of the following general formula:

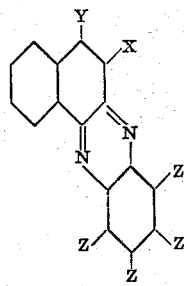

wherein X represents one of the substituents hydrogen or halogen, Y represents one of the substituents of the group consisting of OH, $NH_2$, NH-alkyl, NH-aryl and Z represents hydrogen which may be replaced by any monovalent substituent, are capable of reacting, in the presence of an organic solvent, with a 1.4-quinone containing no substituents in the positions 2 and 3.

By causing the reaction to take place in an indifferent organic solvent first condensation products are obtained whose formation may be illustrated by the following equation:

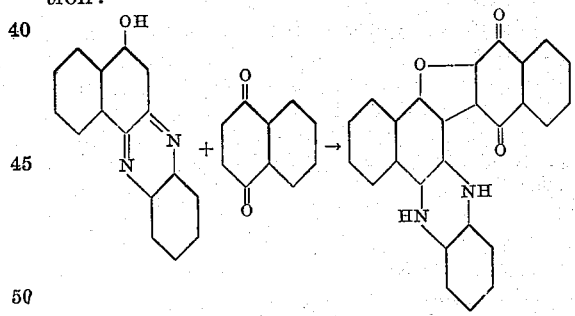

The reaction probably occurs in such a manner that two of the hydrogen atoms becoming disengaged are linked to the two N-atoms with formation of the dihydroazine compound. There is every appearance for this assumption being correct since the condensation to the dihydroazine compound may be effected in the presence of an indifferent solvent which does not contain any oxidizing agent and under an entire exclusion of air, for instance in a nitrogen atmosphere.

By using as starting material the naphthophenazine compounds of the above stated kind, wherein X represents halogen, the same condensation products are obtained as they are produced from naphthophenazine compounds which are free from halogen:

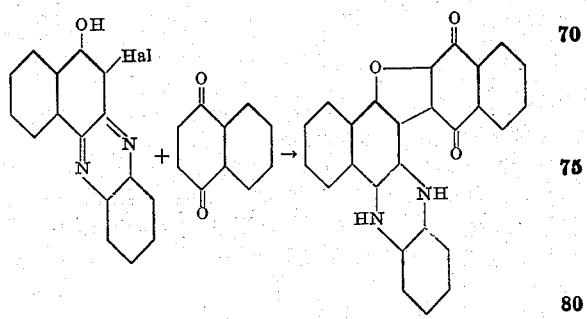

By the conversion the halogen atom is linked to a hydrogen atom so as to form hydrogen halide.

When using as starting material instead of the hydroxy- or hydroxy-halogen naphthophenazines mentioned in the foregoing equations compounds which possess instead of the OH group a $NH_2$, NH-alkyl or NH-aryl group, condensation products are obtainable in which a NH-group or the N-alkyl- or the N-aryl residue is substituted for the O-atom.

Of course, for the conversion also such naphthophenazines of the above named kind may be used as contain substituents in the phenyl residue.

By the action of an oxidizing agent these dihydrophenazine compounds are transformed into compounds containing two hydrogen atoms less as is represented by the following equation:

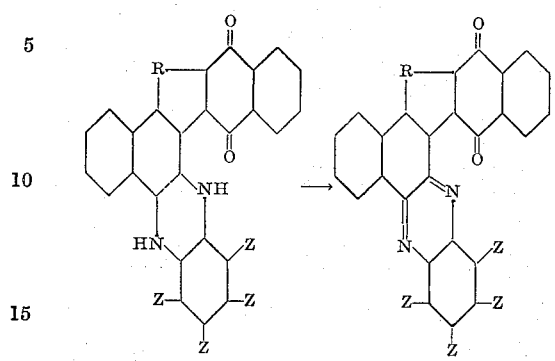

wherein R stands for O, NH, N-alkyl or N-aryl and Z represents hydrogen which may be replaced by any monovalent substituent.

For the purpose of converting the dihydroazine compounds into a higher stage of oxidation they may be isolated and treated with an oxidizing agent or the conversion may directly be effected in the reaction mixture. The oxidation may be carried out in various manners and with various agents. For instance oxygen or air may be introduced, while heating, into a solution or suspension of a dihydroazine compound in an indifferent organic solvent or the compound may be heated with an organic solvent capable of exerting an oxidizing action such as nitrobenzene or they may be treated in the form of a solution or a suspension with an alkaline oxidizing agent such as a hypochlorite solution.

We have claimed this latter special process in our application Serial No. 7,390 filed on February 6, 1925.

By carrying out the conversion of the above mentioned compounds of the following general formula:

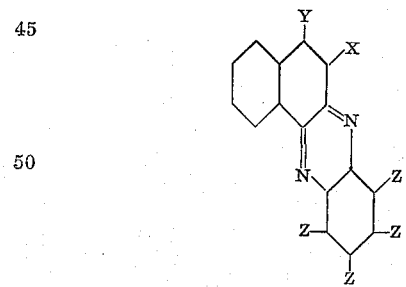

wherein X represents one of the substituents hydrogen or halogen, Y represents one of the substituents of the group consisting of OH, $NH_2$, NH-alkyl, NH-aryl and Z represents hydrogen which may be replaced by any monovalent substituent, with a 1.4-quinone containing no substituents in the positions 2 and 3 from the very beginning in the presence of an organic solvent acting as an oxidizing agent as for instance nitrobenzene the final products are obtainable directly in one operation by way of the intermediate compounds above described. In this case the dihydroazine compounds may, of course, likewise be isolated, if required, by working under proper conditions as to temperature and time.

The end-products as well as the dihydroazine compounds having two hydrogen atoms more may be used for dyeing with the same final result as in the vats prepared from the said compounds in the usual manner probably the same leuco-compound has been formed in both cases:

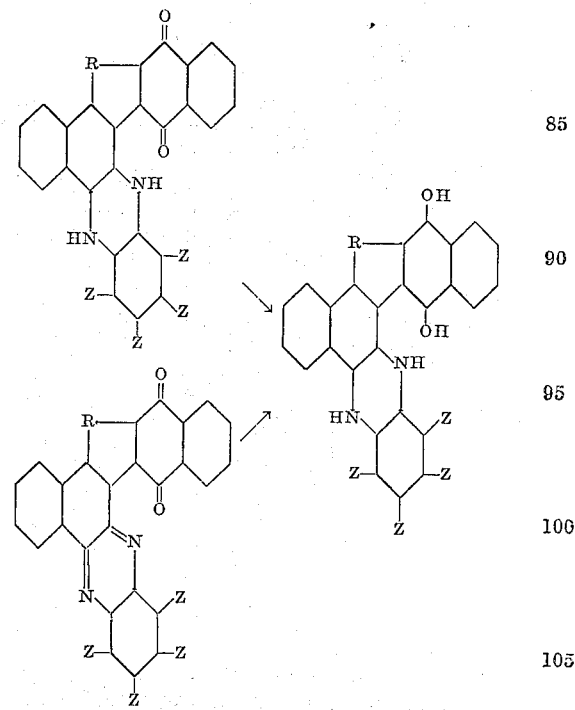

wherein R stands for O, NH, N-alkyl or N-aryl and Z represents hydrogen which may be replaced by any monovalent substituent.

The leuco compounds yield on the fiber from the vat orange-red dyeings. By exposing the dyed material to the air firstly the green dihydroazine compounds are formed which by the further action of the air oxygen are transformed into the dyeings of the final products showing for the most part a yellow coloration.

The following examples serve to illustrate our invention but they are not intended to limit it thereto, the parts being by weight.

(1) 24.6 parts of 1-hydroxynaphthalene-3.4-phenazine and 16 parts of 1.4-naphthoquinone dissolved in 200 parts of ortho-dichlorobenzene are heated to boiling for a short time in a reflux apparatus while introducing a feeble current of nitrogen. Green crystals which precipitate are filtered by suction while excluding air, washed with ortho-dichlorobenzene and dried. The condensation product of the following probable formula:

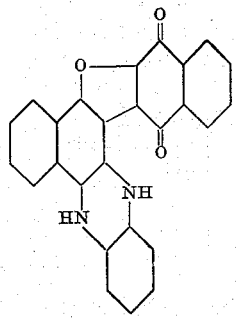

forms an olive-green powder which is insoluble in alkalies alone but is soluble therein only on addition of hydrosulfite while moderately heating. From the yellow-orange vat thus formed the animal and the vegetable fiber, after being exposed to air, is dyed beautiful yellow tints. By exposing the dyed material to the air there is obtained from the yellow-orange leuco compound at first the above described green compound which is then transformed into the yellow stable compound:

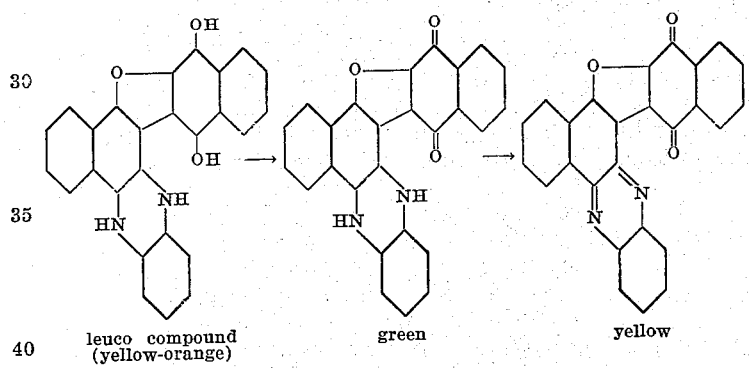

leuco compound (yellow-orange)    green    yellow (2) By heating 10 parts of the olive-green crystalline compound prepared according to Example 1 at 160° C. to 170° C. for about one hour in 60 parts of nitrobenzene, a beautiful yellow crystalline compound of the following probable formula:

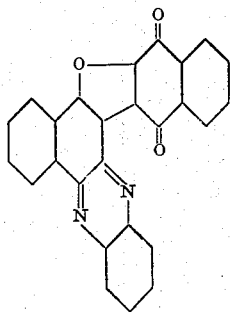

is obtained. After being washed and dried, the product forms a yellow crystalline powder dissolving in concentrated sulfuric acid to an orange-red solution and forming with alkali and hydrosulfite a yellowish-orange vat from which wool and cotton, after being exposed to air, are dyed beautiful yellow tints; also in this case the green compound described in Example 1 is at first obtained as an intermediate product.

The same dyestuff is obtained by heating the olive-green crystalline compound obtained according to Example 1 for some time in the reflux apparatus in about 10 times its weight of ortho-dichlorobenzene while introducing air and oxygen or by moderately heating it for a short time in concentrated sulfuric acid and afterwards precipitating the product by means of water or by treating it at an elevated temperature in a very fine sub-division with a solution of hypochlorite.

(3) 24.6 parts of 1-hydroxynaphthalene-3.4-phenazine and 16 parts of 1.4-naphthoquinone are heated with 200 parts of anhydrous nitrobenzene for 2 hours up to a temperature of about 170° C. to about the boiling point of nitrobenzene. The dyestuff which is precipitated in the form of beautiful yellow needles is filtered by suction, washed with alcohol, extracted with a hot diluted alkali in order to remove a small quantity of unaltered 1-hydroxynaphthalene-3.4-phenazine, then washed with water and dried. The dyestuff thus obtained is identical with that prepared according to Example 2.

Instead of nitrobenzene also other oxidizing solvents may be used as for instance nitrotoluene, dinitrochlorobenzene or the like.

A part of the nitrobenzene, of course, may be replaced by an indifferent solvent as for instance dichlorobenzene. Also by this method the beautiful crystallized yellow dyestuff is obtained.

(4) 24.6 parts of 1-hydroxynaphthalene-3.4-phenazine and 16 parts of 1.4-naphthoquinone are heated to boiling for some time in the reflux apparatus in 200 parts of ortho-dichlorobenzene. By this operation first the olive-green compound described in Example 1 is obtained which by further heating, while introducing air or while adding 50 parts of nitrobenzene, is converted into the yellow dyestuff. After cooling, the said yellow dyestuff is filtered by suction, washed and dried. It is identical with that obtained according to Examples 2 and 3.

(5) 28 parts of 1-hydroxy-naphthalene-3.4-(4-chloro)-phenazine (prepared from β-oxynaphthoquinone and 4-chloro-1.2-diaminobenzene) and 16 parts of 1.4-naphthoquinone are heated for about 1 to 2 hours up to a temperature of about 170° C. to about the boiling point of nitrobenzene with 200 parts of nitrobenzene. After cooling, the dyestuff precipitated is filtered by suction, washed first with alcohol and then with water, treated, if required, with diluted aqueous alkali in order to remove any unaltered hydroxyphenazine, washed again and dried. The dyestuff forms a beautiful yellow crystalline powder which dissolves in concentrated sulfuric acid to an orange-red solution and which dyes wool and cotton from an orange alkaline hydrosulfite vat a greenish-yellow shade. The dyestuff has the following probable formula:

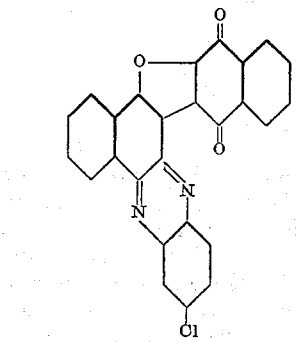

(6) 246 parts of 1-hydroxynaphthalene-3.4-phenazine and 54 parts of 1.4-benzoquinone are heated to a temperature of 140° C. to 150° C. in 3000 parts of nitrobenzene until the condensation is complete. The dyestuff which precipitates in the form of green needles dyes the vegetable and animal fiber from a reddish vat green tints. By treating the dyestuff with a solution of hypochlorite it is converted into a yellow dye paste. The following equation most probably represents the above reaction:

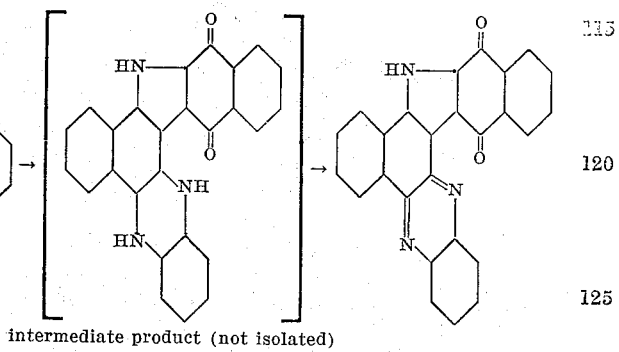

green compound      yellow compound (7) 28 parts of 1-hydroxy-2-chloronaphthalene-3.4-phenazine prepared from 2.3-dichloro-1.4-naphthoquinone by condensation with 1.2-diaminobenzene, and 5.4 parts of 1.4-benzoquinone are heated to a temperature of 140° C. to 150° C. in 300 parts of nitrobenzene until the formation of the dyestuff is complete. After cooling, the green dyestuff separated is filtered by suction and washed first with alcohol and then with water. It is identical with the green product obtained according to Example 6 and is converted into the yellow compound described in Example 6 by treating it with an oxidizing agent.

(8) 49 parts of 1-aminonaphthalene-3.4-phenazine, 32 parts of 1.4-naphthoquinone and 700 parts of nitrobenzene are heated to a temperature of about 170° C. to about the boiling point of nitrobenzene until the condensation is complete. The condensation product is a yellowish-brown body; it dyes wool and cotton from a reddish-brown vat yellow tints. The following equation most probably represents the reaction above described:

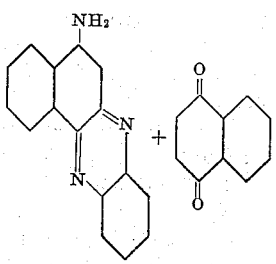

intermediate product (not isolated)

(9) 64 parts of 1-phenylamino-naphthalene-3.4-phenazine and 32 parts of 1.4-naphthoquinone are heated almost to boiling in 600 parts of nitrobenzene until the formation of dyestuff is complete. After cooling, the dyestuff precipitated is filtered by suction, washed first with alcohol and then with water and revatted with an alkaline hydrosulfite solution in order to purify it. After this operation, the condensation product forms a yellow body which dissolves in concentrated sulfuric acid to a red solution and which dyes wool and cotton from a reddish-brown vat, after being exposed to air, greenish-yellow tints. The dyestuff has the following probable formula:

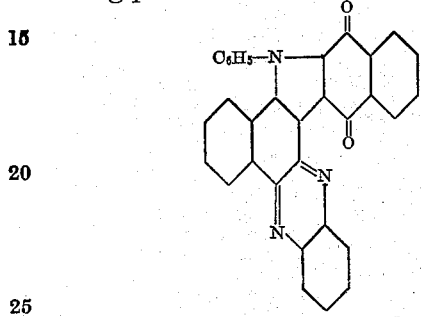

By sustituting in Example 9 for the 1-phenylaminonaphthalene-3.4-phenazine the corresponding quantity of 1-methyl- or 1-ethlaminonaphthalene-3.4-phenazine a dyestuff is obtained which has similar tinctorial properties.

It is to be understood that in the processes herein described instead of compounds of the general formula:

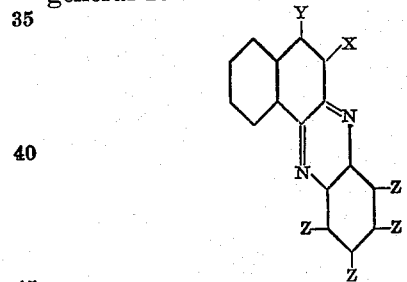

wherein X represents a substituent of the group consisting of hydrogen and halogen, Y represents a substituent of the group consisting of OH, NH₂, NH-alkyl and NH-aryl and Z represents hydrogen which may be replaced by any other monovalent substituent, there may be used compounds of the general formula:

wherein X and Z have the same values as above described.

This application contains subject matter in common with our co-pending U. S. application Serial No. 7390 filed on February 6, 1925 and is to be regarded as a continuation in part of the said application.

We claim:

1. The process which comprises heating a compound of the general formula:

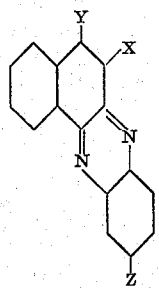

wherein X represents a substituent of the group consisting of hydrogen and halogen, Y represents a substituent of the group consisting of OH, NH₂, NH-alkyl, NH-aryl and Z represents hydrogen or halogen, with a 1.4-quinone containing no substituents in the positions 2. and 3 in the presence of an organic oxidizing solvent at a temperature of about 170° C. to about the boiling point of the solvent used.

2. The process which comprises heating a compound of the general formula:

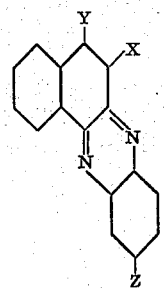

wherein X represents a substituent of the group consisting of hydrogen and halogen, Y represents a substituent of the group consisting of OH, NH₂, NH-alkyl, NH-aryl and Z represents hydrogen or halogen with a 1.4-quinone containing no substituents in the positions 2 and 3 in the presence of nitrobenzene at a temperature of about 170° C. to about the boiling point of nitrobenzene.

3. The process which comprises heating a compound of the general formula:

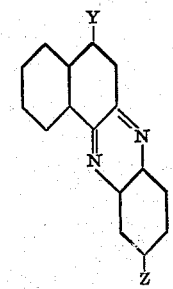

wherein Y represents a substituent of the group consisting of OH, NH$_2$, NH-alkyl, NH-aryl and Z represents hydrogen or halogen, with a 1.4-quinone containing no substituents in the positions 2 and 3 in the presence of nitrobenzene at a temperature of about 170° C. to about the boiling point of nitrobenzene.

4. The process which comprises heating 1-hydroxynaphthalene-3.4-phenazine with a 1.4-quinone containing no substituents in the positions 2 and 3 in the presence of an organic oxidizing solvent at a temperature of about 170° C. to about the boiling point of the solvent used.

5. The process which comprises heating 1-hydroxynaphthalene-3.4-phenazine with a 1.4-quinone containing no substituents in the positions 2 and 3 in the presence of nitrobenzene at a temperature of about 170° C. to about the boiling point of nitrobenzene.

6. The process which comprises heating 1.-hydroxynaphthalene-3.4-phenazine with 1.4-naphthoquinone in the presence of an organic oxidizing solvent at a temperature of about 170° C. to about the boiling point of the solvent used.

7. The process which comprises heating 1-hydroxynaphthalene-3.4-phenazine with 1.4-naphthoquinone in the presence of nitrobenzene at a temperature of about 170° C. to about the boiling point of nitrobenzene.

In testimony whereof, we affix our signatures.

GEORG KRÄNZLEIN.
HEINRICH GREUNE.
HEINRICH VOLLMANN.